United States Patent Office

Re. 27,794
Reissued Oct. 30, 1973

27,794

HEAT TREATMENT OF MOLTEN CARBONACEOUS MATERIAL PRIOR TO ITS CONVERSION TO CARBON FIBERS AND OTHER SHAPES

Sugio Otani, Hishi-machi, Japan, assignor to Kureha Kagaku Kogyo Kabushiki Kaisha, Tokyo-to, Japan No Drawing. Original No. 3,392,216, dated July 9, 1968, Ser. No. 406,603, Oct. 26, 1964. Application for reissue July 7, 1970, Ser. No. 52,817
Claims priority, application Japan, Nov. 1, 1963, 38/58,942; Sept. 1, 1964, 39/49,772
Int. Cl. C01b *31/07;* D06m *11/04, 11/12*
U.S. Cl. 264—29 8 Claims

Matter enclosed in heavy brackets [ ] appears in the original patent but forms no part of this reissue specification; matter printed in italics indicates the additions made by reissue.

ABSTRACT OF THE DISCLOSURE

A method is provided for the production of carbon shaped articles in the form of filaments, yarns, ribbons, films, sheets, tubes and the like. The shaped articles resulting from the process are likewise provided. The method comprises the steps of (a) heating a natural or synthetic organic substance *such as polyvinyl chloride, polyacrylonitrile, petroleum pitch, coal pitch and others,* in the presence of an inert gas to a temperature in the range of about 300° to 500° C., which temperature is below the carbonization temperature of such substance,
(b) bringing the temperature of the substance to a temperature below the carbonization temperature *in an inert atmosphere* and forming the substance [in an inert atmosphere] into a desired shape,
(c) contacting the shaped article with an oxidizing gas, and
(d) subjecting the article to carbonization by heating in an inert atmosphere at a temperature substantially above 500° C.

The shaped articles are useful for a wide range of uses, as for example, thermal insulation materials, carbon electrodes, and the like.

This invention relates to techniques in the production of carbon structures including shaped articles and more particularly to a new method for producing shaped articles of carbon from molten baked organic substances.

While the present invention is intended to cover the production of carbon structures including shaped articles in the form of filaments, yarns, ribbons, films, sheets, tubes, and the like, the following disclosure will be presented principally with respect to filaments as a representative structure for the sake of brevity, other forms being readily produced according to the invention by apparatus and processes generally known in the art, the detailed operating conditions being suitably modified.

Heretofore, as a method of producing carbon filaments, the method of carbonizing filaments of organic substances such as cellulose filaments and acrylonitrile filaments while the filaments are retained in their original form has been known. This method requires starting materials of high cost and is accompanied by certain difficulties such as the susceptibility of the filaments to loss of their original form at the heat-treatment process and insufficient mechanical strength of the carbon filaments so produced.

It is a general object of the present invention to provide a method for producing carbon structures whereby the above described difficulties are overcome, and, moreover, to provide carbon structures having unprecedentedly high strength, high uniformity of cross section, and high lustre, in spite of the use of low-cost starting materials.

It is another object to include in the method steps an oxidation treatment, particularly an ozone treatment, in certain instances to improve the properties of the resulting product.

According to the present invention there is provided a method for producing shaped articles of carbon which comprises melt extrusion and stretching of a molten stock resulting from the baking, at a temperature of from 300 to 500° C., of [a] natural or synthetic organic substances. The melt extrusion is accomplished at the baking temperature of said starting material or in the temperature region therebelow. The extrusion is followed by an oxidation treatment and a carbonization treatment of the resulting filament under nitrogen.

The present invention is based on the remarkable discovery that when many kinds of organic compounds are heated at a suitable temperature in the range from 300 to 500° C., the resulting molten products shortly before carbonization exhibit excellent spinnability.

Examples of natural or synthetic organic substances which can be used in the practice of the present invention are synthetic high-polymer substances such as polyvinyl chloride and polyacrylonitrile, and high-polymer or low-polymer organic substances such as petroleum pitch, coal and coal pitch, distillation residues of benzyl chloride and chlorobenzene, and by-products of DDT.

The unique phenomenon is observed in the following manner using the case of polyvinyl chloride by way of example. When the heating temperature of polyvinyl chloride is gradually raised in an inert gas, coloration thereof begins at 160° C., and at a temperature between 200 and 250° C. the entire substance expands and darkens in color, eventually becoming black. Up to this temperature the baked substance is soft, but when heated further to a temperature between 250 and 300° C. it contracts in volume and [become] *becomes* hard. At this stage there takes place the dehydrochlorination (removal of hydrogen chloride) which may be considered to be the main reaction of the thermal decomposition of polyvinyl chloride.

Then, if the raising of the temperature is continued, cyclization and three-dimensional crosslinking will occur, and at a temperature between 400 and 420° C., the three-dimensional linking will be abruptly cut off. The resulting substance in the pitch state is considered to be a polycyclic aromatic compound closely related in structure to aromatic plane component making up amorphous carbon. If the temperature is raised to 500° C., this polycyclic aromatic compound will again harden without remarkable weight loss and become a lustrous, massive substance which is insoluble and unmeltable.

If the aforementioned substance in the pitch state is cooled to 150° C., or lower temperature, it will also become a black, lustrous solid. This solid can be readily dissolved in benzene, chloroform, and other solvents and melts when heated over 150° C.

Examination of X-ray and absorption spectrum conducted at each of the above described stages of procedure, shows to be that when the temperature of the baked substance reaches 500° C., the substance becomes carbon in terms of crystallography.

The term "carbon" is herein used in the crystallographical meaning to designate that structure wherein condensed polycyclic planes are arranged in laminar form. The temperature region higher than so called thermal-decomposition temperature and lower than the carbonization temperature is herein called the "temperature region shortly before the carbonization." This temperature region differs with different substances and, even with the same substance, it varies somewhat depending on the surrounding atmosphere and the rate of heating. However, in any case this temperature region does not depart greatly from the range of approximately from 300 to 500° C.

The natural or synthetic organic substance used in the method of this invention is heated to a temperature in the region of 300 to 500° C. shortly before the carbonization in a nitrogen gas ($N_2$), carbon dioxide gas ($CO_2$), or some other inert gas atmosphere, or under conditions wherein oxygen does not exist. At this stage, it appears that both high and low molecular weight substances, while the material being treated, undergo fission or coupling to molecules composed principally of polycyclic aromatic structure, whereby both types of substances change into molten baked substances having substantially the same range of molecular size and having plasticity.

Moreover, by melt spinning or otherwise melt extruding the substance in this state by a suitable method, the substrance is shaped into the desired form such as filaments, which, as a result of the succeeding oxidation treatment with air or other agent and heat treatment, is unexpectedly rendered unmeltable in a very easy manner. By subjecting this extruded material further to carbonization or graphitization it is possible to obtain the objective carbon or graphite article such as filaments.

When this temperature is 300° C. or less, sufficient fission and recoupling of the carbon-carbon chain do not occur. When the temperature exceeds 500° C., recoupling of the carbon-carbon chain occurs, and the plasticity of the substance is lost (the temperature producing this state being called the "carbonization temperature"), and accordingly the filaments or other structure which is the objective product of the invention cannot be obtained.

That is, by heating the starting material at a suitable temperature below the carbonization temperature within the range of from 300 to 500° C. for a suitable time, for example, from 5 minutes to 10 hours, the necessary rearrangement of the molecules is effected, and a plastic material suitable for melt extrusion (for example, melt spinning) is obtained.

The baked substance in a pitch state, heated for a suitable time at a suitable temperature in the range of from 300 to 500° C. may be cooled once, preserved, and then reheated for the succeeding melt extrusion process, or it may be immediately subjected to an apropriate temperature change in order to adjust its molten viscosity for the succeeding extrusion process and then extruded (for example, spun as filaments).

A temperature below the aforementioned baking temperature is ordinarily selected for the extrusion temperature. The extrusion process is preferably carried out in an atmosphere of an inert gas as mentioned hereinabove, but the extruded article (for example, filaments) is caused to contact air or an oxidizing gas at the extrusion temperature or lower temperature for a number of minutes or longer. It has been found that this process is remarkably effective. It appears that, by this process, recoupling occurs together with the alinement of the [modecules] *molecules* in the extrusion (filament) direction during the succeeding stretching process or subsequent process to which the extruded article is subjected, whereby high polymer carbon material (carbon filaments) of insoluble and unmeltable characteristic is further produced.

The carbon extruded article (filaments) obtained in the above manner are subsequently carbonized amply in a state wherein they are not in contact with oxidizing gases such as air. The rate of heating during this step is preferably 10° C./minute or lower. When this temperature rises above 600 to 700° C. to approximately 1,500° C., the shaped article (filaments) assumes mechanical strength of practical magnitude. If necessary, the article can be further subjected to heat treatment at 2,000° C. or higher temperature to produce a graphite article (filaments).

Carbon filaments or graphite filaments produced in the above described manner can be used effectively for a wide range of uses, examples of which are thermal insulation materials, carbon electrode, other basic materials for carbon and graphite products, reinforcement materials in general, reinforcement materials for various products made of synthetic resins, electroconductive and heating mats, heat-resistant packings, fillers for electroconductive paints, and various resistance materials for electronics.

In order to indicate more fully the nature of the invention a few examples of typical procedure are presented hereinbelow.

Example 1

100 grams of polyvinyl chloride powder was heated in nitrogen gas (inert gas) at a rate of 1° C./minute up to 400±5° C., which temperature was maintained for one hour, whereupon 30 grams of a molten baked substance was obtained. (When this substance is cooled to room temperature, it solidifies, and, further, when it is crushed, it becomes a brownish black powder.)

This substance was heated rapidly to 275±5° C. and melted as carbon dioxide gas was caused to flow over its surface. The molten substance was then extruded into air and stretched to produce filaments of diameters of from 20 to 30 microns. These filaments were heated from room temperature at a rate of 5° C./minute up to 250° C. at which temperature $N_2$ gas was caused to flow to replace air, and the heating was continued at the same rate up to 900° C., which was then maintained constant for ten minutes. The filaments were then left to cool naturally.

As a result, carbon filaments having a strength (tenacity) of $4\times10^6$ grams/cm.$^2$ were obtained.

In contrast, when polyvinyl chloride filaments were heated gradually in air to 300° C. and then baked in $N_2$ gas up to 500° C., the strength of the resulting carbon filaments was only $9\times10^4$ grams/cm.$^2$.

Example 2

The distillation residue which is a by-product in the production of benzyl chloride from the reaction of chlorine with toluene is a brownish black, tar-form substance. 250 grams of this substance was heated to 400° C. in a stream of $N_2$ gas and subjected to dry distillation, the same temperature then being maintained for a further 30 minutes to remove low-temperature boiling point components and decomposition products.

As a result of this dry distillation treatment, 100 grams of a pitch-form product was obtained. This resulting substance is in the liquid state at 400° C., and at room temperature it is a brownish black, lustrous solid, which when crushed becomes brown in color. This substance was rapidly heated and in a molten state at from 220 to 240° C. was spun into air, whereupon it was readily shaped into filament form.

These filaments so spun were [heated] *heat*-treated in air for 30 minutes at 150° C. and for 30 minutes at 200° C. and then baked in $N_2$ gas in the same manner as set forth in Example 1.

As a result, carbon filaments exhibiting a strength of $4.2\times10^6$ grams/cm.$^2$ were obtained.

Example 3

250 grams of the same distillation residue of benzyl chloride as used in Example 2 was heated to 400° C. in a stream of $N_2$ gas and dry distilled. The temperature was maintained for a further 30 minutes, and then, as the pitch state of the resulting substance was maintained, it was gradually cooled from 220 to 240° C. and then spun at this temperature, whereupon a filament-form product was readily obtained. By subjecting this product to the same heat treatment as set forth in Example 2, excellent carbon filaments were obtained.

The present invention, in another important aspect thereof, provides a new oxidation treatment step for the product subsequent to its melt extrusion. By this treatment great saving is effected in the time and heat supply necessary for the process of producing carbon filaments and other carbon structures. This treatment affords not only economic advantage but also substantial improvement in the quality of the product, particularly making possible the production of carbon filaments of remarkably high strength.

When carbon filaments are produced from molten baked substances, the oxidation treatment subsequent to baking is particularly an important problem. Heretofore, it has been considered that the only possible method for effecting this treatment is that of heating and oxidizing the filaments at a low temperature in air. According to the present it has been discovered that by carrying out oxidation due to ozone in a temperature range below 100° C., the beneficial effects of the treatment as mentioned above can be attained in a very effective manner.

While it is desirable that the melt extrusion process be carried out in an atmosphere of inert gas such as $N_2$, Ar, and $CO_2$, as described hereinabove, the extruded filaments, according to the method of this invention, are caused to contact air or an oxidizing gas at the extrusion temperature or lower temperature for several minutes or longer.

In one embodiment of this process according to the invention, a treatment is carried out on the filaments with air containing ozone or with oxygen gas for a suitable time of 7 hours or less at a suitable temperature in the range of from room temperature to 100° C., and immediately thereafter the filaments are subjected to oxidation treatment in air at a temperature range up to 260° C.

Although the chemical change occurring because of the ozone treatment is not fully apparent, it appears, from the increase in weight and result of measurement of infrared absorption spectrum, that an addition of oxygen is effected, and this, in itself, forms a three-dimensional bridge structure while, at the same time, effectively promoting the formation of bridge couplings due to the succeeding oxidation in air.

The filaments so obtained are then subjected to ample carbonization treatment in a state wherein they are not in contact with an oxidizing gas such as air as described hereinbefore.

Measurement of the relationship between the characteristics of the carbon filaments obtained in the above described manner and the ozone treatment process constituting a unique feature of this invention reveals a remarkable increase in the strength of the carbon filaments as is indicated in the examples set forth hereinafter. This ozone treatment not only is highly effective in improving the properties of the carbon filaments obtained but also greatly contributes to the economical carrying out of the preceding treatment process.

That is, as shown in Example 4 to follow, by carrying out a 3-hour ozone treatment at 70° C., it is possible to shorten substantially and freely the time of preparatory oxidation treatment necessary for rendering the product insoluble without difficulty. This desirable effect cannot be expected from a simple heating in air. Moreover, a treatment imparting such a great effect on the quality of carbon filaments has heretofore been unknown as far as we are aware.

This effect is particularly pronounced in the case where the diameters of the filaments are small. The reason for this appears to be that in the case of small diameters, the surface area increases, whereby the surface energy increases, and, at the same time, the ozone treatment is caused to take effect with increased thoroughness throughout the entire filament structure.

[In order to indicate more fully the nature of the above described treatment according to the invention, the following few examples of procedure are set forth, it being understood that these examples and the other preceding examples are presented as illustrative only and not as limiting the scope of the invention.]

Example 4

100 grams of polyvinyl chloride powder was heated in nitrogen gas (inert gas) at a rate of 1° C./minute up to 400±5° C., which temperature was maintained for one hour, whereupon 30 grams of a molten baked substance was obtained as described in Example 1.

This substance was heated rapidly to 275±5° C. and melted as $N_2$ gas was caused to flow over its surface. The molten substance was then extruded through a jet (spinneret) into air to produce filaments having diameters of from 5 to 30 microns. These filaments were ozone treated under the following conditions.

(1) Treatment temperatures: 25, 50, and 70 degrees C.

(2) Ozone concentration: 10.4 grams/cubic meter; ozone flowrate: 150 liters/hour.

(3) Treatment time: 3 hours in all cases.

It was found that this treatment caused weight increases of from 0.5 to 1.2 percent in the filaments, and it was verified through infrared absorption spectrum observation that a C=O radical in the vicinity of 1,700 cm.$^{-1}$ was formed. It was found further that, in the case of treatment at 70° C., a part of the product was rendered insoluble relative to benzene.

The filaments so treated were then heated in air to 260° C. and maintained at this temperature for one hour, after which they were carbonized by the normal procedure by heating in $N_2$ gas to 1,000° C.

The relationship between the strength of the resulting carbon filaments and the ozone treatment temperature is as indicated in the following Table 1.

TABLE 1

| Ozone treatment | Strength (grams/cm.$^2$) |
|---|---|
| None | $4.5\times10^6$ |
| At 25° C. | $5.5\times10^6$ |
| At 50° C. | $6.5\times10^6$ |
| At 70° C. | $7.3\times10^6$ |

NOTE: Diameter of sample filaments was 15 microns.

Example 5

Samples similar to those in Example 4 except that the spinning conditions were varied suitably to obtain filaments of different diameters were prepared, which were all ozone treated *at* 70° C. for 3 hours. The other treatment conditions were the same as those in Example 1. As a result, carbon filaments having final diameters of 15, 10, and 8.5 microns were obtained.

The results of measurement of the strengths of the filaments so obtained are as shown in the following Table 2, from which it is apparent that the effect of the ozone treatment is pronounced in the case of filaments of small diameters, and that filaments of very high strength can be obtained in this case.

TABLE 2

| Filament diameter (microns) | Strength (grams/cm.$^2$) |
|---|---|
| 15 | $7.3\times10^6$ |
| 10 | $13.5\times10^6$ |
| 8.5 | $16.0\times10^6$ |

It should be understood, of course, that the foregoing disclosure relates to only particular examples of the invention and that it is intended to cover all changes and modifications of the examples of the invention herein chosen for the purposes of the disclosure, which do not constitute departures from the spirit and scope of the invention as set forth in the appended claims.

What I claim is:

1. A method for the production of carbon shaped articles which comprises:

(a) heating an organic substance selected from the group of natural and synthetic substances which (1)

undergo fission or coupling to molecules composed principally of polycyclic aromatic structure, and (2) are in a molten state at a temperature of about 300 to 500° C. in an inert atmosphere in the presence of an inert gas at a temperature in the range of about 300 to about 500° C. which temperature is below the carbonization temperature of the substance *for a time sufficient to cause the material to undergo fission or coupling to molecules composed principally of polycyclic aromatic structure whereby both types of substances change into molten baked substances having substantially the same range of molecular size and having plasticity,*

(b) bringing the thus-heated organic substance to a forming temperature which is below the range of 300 to 500 C., and higher than the softening point thereof in an inert atmosphere, and forming the mass into the desired shape, (c) [contacting] *oxidizing* the resultant shaped article *by contacting the same* with an oxidizing gas at a temperature between room temperature and the shaping temperature, and (d) subjecting the resultant article to carbonization by heating such article in an inert atmosphere to a temperature substantially above 500° C.

2. A method for the production of carbon shaped articles which comprises:

(a) heating an organic substance selected from the group of natural and synthetic substances which (1) undergo fission or coupling to molecules composed principally of polycyclic aromatic structure, and (2) are in a molten state at a temperature of about 300 to 500° C. in an inert atmosphere in the presence of an inert gas at a temperature in the range of about 300 to about 500° C. which temperature is below the carbonization temperature of the substance *for a time sufficient to cause the material to undergo fission or coupling to molecules composed principally of polycyclic aromatic structure whereby both types of substances change into molten baked substances having substantially the same range of molecular size and having plasticity,*

(b) subsequently cooling the thus-heated organic substance to room temperature, reheating to a forming temperature which is below the range of 300 to 500° C., and higher than the softening point thereof, in an inert atmosphere, and forming the mass into the desired shape, (c) [contacting] *oxidizing* the resultant shaped article *by contacting the same* with an oxidizing gas at a temperature between room temperature and the shaping temperature, and (d) subjecting the resultant article to carbonization by heating such article in an inert atmosphere to a temperature substantially above 500° C.

3. A method as in claim 2 wherein the organic substance is a member selected from the group consisting of polyvinyl chloride, polyacrylonitrile, petroleum pitch, coal, coal pitch, distillation residue of benzyl chloride and chlorobenzene, and by-products of DDT.

4. A method as in claim 2 wherein the heated organic substance resulting from (a) is melt extruded to form a fiber.

5. A method as in claim 2 wherein the heated organic substance resulting from (a) is melt extruded to form a film.

6. A method as in claim 2 wherein the oxidizing gas in (c) is selected from the group consisting of air, oxygen gas and air containing ozone.

7. A method as in claim 2 wherein the shaped article is contacted with air containing ozone at a temperature in the range of from room temperature to 100° C.

8. A method as in claim 2 wherein the shaped article is contacted with air containing ozone at a temperature of from room temperature to 100° C. for less than seven hours and subsequently contacted with air at a temperature of up to 260° C.

References Cited

The following references, cited by the Examiner, are of record in the patented file of this patent or the original patent.

UNITED STATES PATENTS

| | | | |
|---|---|---|---|
| 3,392,216 | 7/1968 | Otani | 264—29 |
| 3,258,363 | 6/1966 | Lieb | 23—209.2 |
| 3,092,519 | 6/1963 | Olson | 136—146 |
| 2,437,687 | 3/1948 | Dreyfus et al. | 264—176 |

OTHER REFERENCES

S. Otani et al., "On the Raw Materials of MP Carbon Fiber," 1966, vol. 4, Carbon, Pergamon Press Ltd., Great Britain, 425–432.

DONALD J. ARNOLD, Primary Examiner

J. H. MILLER, Assistant Examiner

U.S. Cl. X.R.

23—209.2; 264—83, 85, 176, DIG. 19